United States Patent
Mizokuchi (10) Patent No.: US 11,531,230 B2
(45) Date of Patent: Dec. 20, 2022

(54) OPTICAL FORMING DEVICE AND FORMING METHOD

(71) Applicant: TIANMA JAPAN, LTD., Kanagawa (JP)

(72) Inventor: Chikaaki Mizokuchi, Kanagawa (JP)

(73) Assignee: TIANMA JAPAN, LTD., Kanagawa (JP)

( * ) Notice: Subject to any disclaimer, the term of this patent is extended or adjusted under 35 U.S.C. 154(b) by 178 days.

(21) Appl. No.: 17/086,512

(22) Filed: Nov. 2, 2020

(65) Prior Publication Data
US 2021/0132437 A1 May 6, 2021

(30) Foreign Application Priority Data
Nov. 5, 2019 (JP) .............................. JP2019-201028

(51) Int. Cl.
*G02F 1/1335* (2006.01)
*B29C 35/00* (2006.01)
*B29C 35/08* (2006.01)

(52) U.S. Cl.
CPC ...... *G02F 1/133528* (2013.01); *B29C 35/002* (2013.01); *B29C 35/0805* (2013.01); *G02F 1/133541* (2021.01)

(58) Field of Classification Search
CPC .................................................. G02F 1/133528
See application file for complete search history.

(56) References Cited

U.S. PATENT DOCUMENTS
2011/0002039 A1*  1/2011  Seo ...................... G02B 27/285
                                                                    427/510

FOREIGN PATENT DOCUMENTS
JP            07-232383 A       9/1995
WO     WO-2012086977 A2 *  6/2012    ........... G02B 5/3083

* cited by examiner

*Primary Examiner* — Edmond C Lau
(74) *Attorney, Agent, or Firm* — Sughrue Mion, PLLC (57) ABSTRACT

An optical forming device includes a light source to emit light for causing liquid photocurable resin to undergo curing and an optical modulator to modulate the light for causing the liquid photocurable resin to undergo curing in a pattern based on a shape of a three-dimensional object, and irradiate the liquid photocurable resin with the modulated light. The optical modulator includes a liquid crystal device to modulate the light for causing the liquid photocurable resin to undergo curing in the pattern, and emit the modulated light as linearly polarized light and an optical retardation device to impart a phase difference to the linearly polarized light emitted from the liquid crystal device, and emit the light imparted with the phase difference.

4 Claims, 4 Drawing Sheets

OPTICAL FORMING DEVICE AND FORMING METHOD

FIELD

This application relates to an optical forming device and a forming method.

BACKGROUND

Techniques for forming a three-dimensional object by irradiating a photocurable resin with light based on a cross-sectional shape of the three-dimensional object are known. For, example, Unexamined Japanese Patent Application Publication NO. H7-232383 discloses a method of forming a three-dimensional object by selectively irradiating the photocurable resin with light by a liquid crystal shutter.

In the forming method of Unexamined Japanese Patent Application Publication No. H7-232383, after a single layer worth of photocurable resin is cured by selectively irradiating the photocurable resin with light by the liquid crystal shutter, the cured photocurable resin is moved in a direction away from the liquid crystal shutter. Then, the next layer worth of photocurable resin is cured by selectively irradiating the photocurable resin that flows onto the cured photocurable resin with light by the liquid crystal shutter. The forming method of Unexamined Japanese Patent Application Publication No. H7-232383 forms a three-dimensional object by repeating these steps.

Generally, a liquid crystal shutter emits linearly polarized light. However, polymerization initiator included in photocurable resin most effectively absorbs linearly polarized light when the vibration direction of the incident linearly polarized light (polarization direction) is parallel with the transition moment of the polymerization initiator, thereby initiating polymerization of monomers, oligomers, and the like included in the photocurable resin. Therefore, in the forming method of Unexamined Japanese Patent Application Publication No. H7-232383, unevenness in the density of the cured photocurable resin can arise depending upon the relationship between the vibration direction of the linearly polarized light emitted from the liquid crystal shutter and the direction of the in-flow of photocurable resin after the cured photocurable resin is moved. The unevenness in the density of the cured photocurable resin results in warping, cracking, and the like of the three-dimensional object. Also, in the forming method of Unexamined Japanese Patent Application Publication No. H7-232383, light utilization efficiency drops because the photocurable resin is irradiated with linearly polarized light.

SUMMARY an optical forming device in a first aspect of the present disclosure includes:
a light source to emit light for causing a liquid photocurable resin to undergo curing; and
an optical modulator to modulate the light for causing the liquid photocurable resin to undergo curing in a pattern based on a shape of a three-dimensional object, and irradiate the liquid photocurable resin with the modulated light,
wherein the optical modulator includes
a liquid crystal device to modulate the light for causing the liquid photocurable resin to undergo curing in the pattern, and emit the modulated light as linearly polarized light, and
an optical retardation device to impart a phase difference to the linearly polarized light emitted from the liquid crystal device, and emit the light imparted with the phase difference.

A forming method according to a second aspect of the present disclosure includes:
a step of imparting a phase difference to linearly polarized light emitted from a liquid crystal device that modulates light from a light source, and irradiating a liquid photocurable resin with the light imparted with the phase difference, thereby causing the liquid photocurable resin to undergo curing; and
a step of moving the cured photocurable resin in an emission direction of the light imparted with the phase difference.

It is to be understood that both the foregoing general description and the following detailed description are exemplary and explanatory and are not restrictive of this disclosure.

BRIEF DESCRIPTION OF THE DRAWINGS

A more complete understanding of this application can be obtained when the following detailed description is considered in conjunction with the following drawings, in which.

DETAILED DESCRIPTION

An optical forming device according to the embodiments is described below with reference to the drawings.

Embodiment 1

An optical forming device 100 according to the present embodiment is described with reference to FIG. 1 to FIG. 4. The optical device 100 forms a three-dimensional object Ob from a liquid photocurable resin RL.

Figure 1:
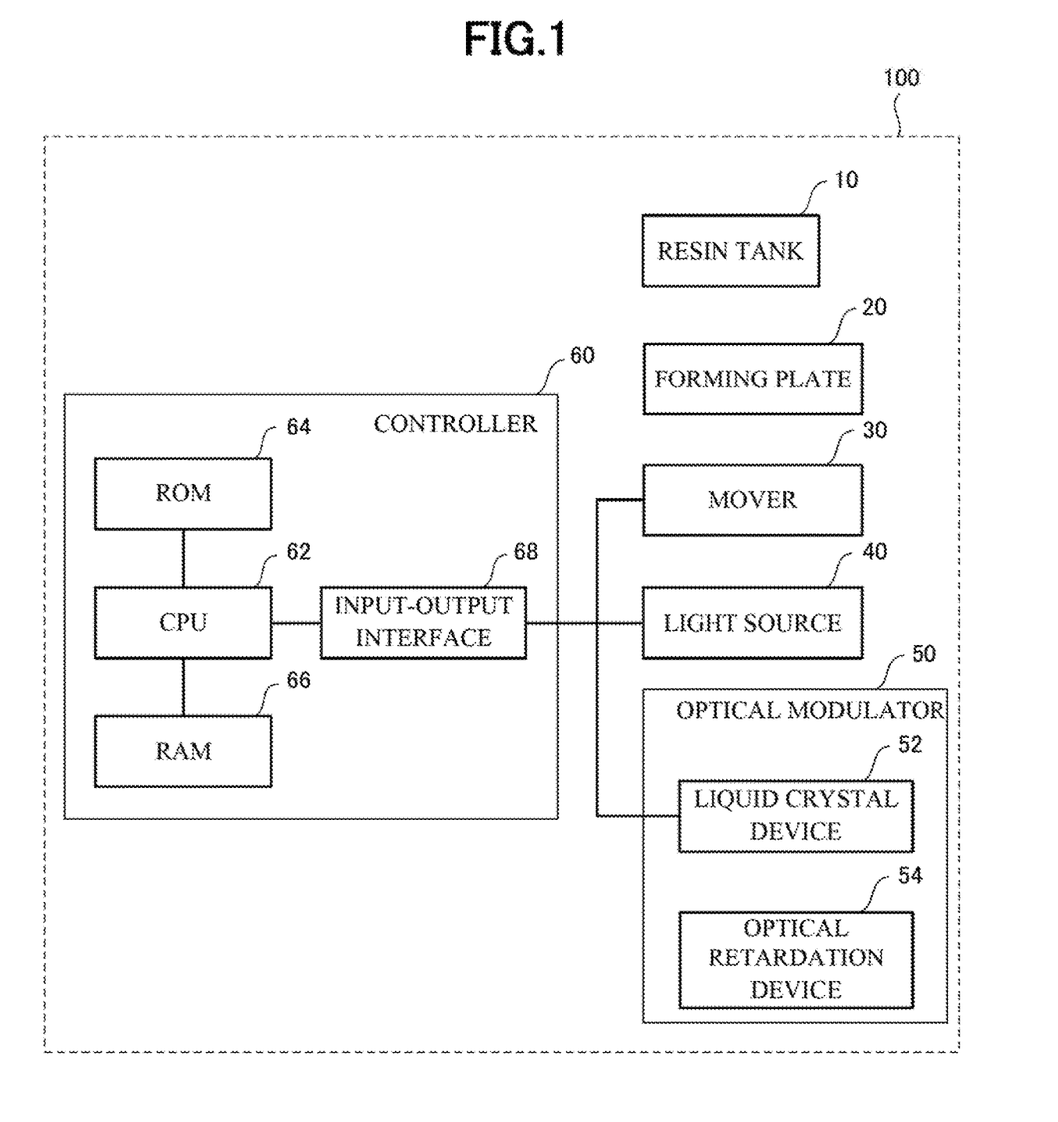
FIG. 1 is a diagram illustrating a configuration of an optical forming device according to Embodiment 1.
Figure 2:
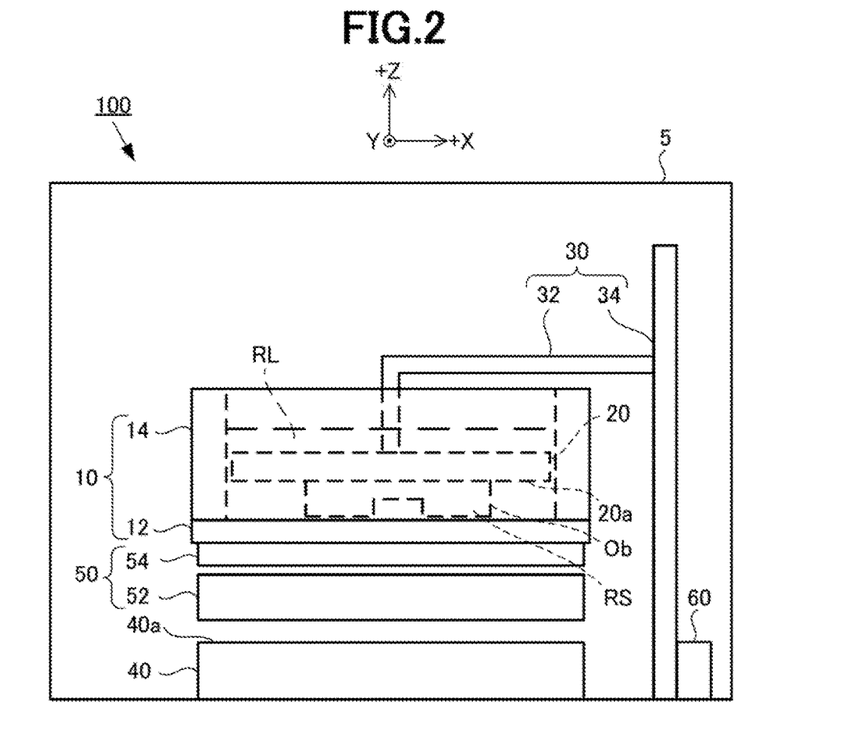
FIG. 2 is a schematic diagram illustrating the optical forming device according to Embodiment 1.

The optical forming device 100, as illustrated in FIG. 1 and FIG. 2, includes a resin tank 10, a forming plate 20, a mover 30, a light source 40, an optical modulator 50, and a controller 60, all being housed within a housing 5 of the optical forming device 100. The resin tank 10 retains a liquid photocurable resin RL. The three-dimensional object Ob is formed on a surface 20a of the forming plate 20. The mover 30 causes the forming plate 20 to move. The light source 40 emits light for causing the liquid photocurable resin RL to undergo curing. The optical modulator 50 modulates light, for causing the liquid photocurable resin RL to undergo curing, in pattern based on a shape of the three-dimensional object Ob. The optical modulator 50 includes a liquid crystal device 52 and an optical retardation device 54. The controller 60 controls each of the components of the optical forming device 100.

In the present disclosure, in order to facilitate understanding, the longitudinal right direction of the optical forming device 100 in FIG. 2 (the direction toward the right of FIG. 2) is defined as +X direction, the upward direction (the direction toward the top of FIG. 2) is defined as +Z direction, the direction perpendicular to the +X and +Z directions (the direction toward the front of FIG. 2) is defined as +Y direction.

The resin tank 10 of the optical forming device 100, as illustrated in FIG. 2, retains the liquid photocurable resin RL. The resin tank 10 is a box-shaped container having an opening at the +Z side surface of the resin tank 10. The resin tank 10 includes a bottom portion 12 and a wall portion 14.

The bottom portion 12 of the resin tank 10 enables light, for causing the liquid photocurable resin RL to undergo curing, emitted from the light source 40 to pass therethrough. Also, the bottom portion 12 enables gas that inhibits curing of the liquid photocurable resin RL, more specifically gas (oxygen, for example) that inhibits polymerization of monomers, oligomers, and the like included in the liquid photocurable resin RL, to pass therethrough. The bottom portion 12 is formed of porous film that enables oxygen to permeate therethrough. The porous film includes polytetrafluoroethylene (PTFE), polyethylene (PE), and the like. The wall portion 14 blocks light from curing the liquid photocurable resin RL. The wall portion 14 is formed of resin, metal, and the like.

Here, the liquid photocurable resin RL is described. The liquid photocurable resin RL is a liquid resin that cures by being irradiated with light of a predetermined wavelength. In the present embodiment, the liquid photocurable resin RL cures by being irradiated with light emitted by the light source 40. The liquid photocurable resin RL includes monomers, oligomers, a polymerization initiator, and the like. The polymerization initiator absorbs light emitted by the light source 40 to generate active species of radicals, ions, and the like, causing polymerization of the monomers, oligomers, and the like to begin. In the present embodiment, the liquid photocurable resin RL is a liquid ultraviolet (UV) curable resin.

The forming plate 20 of the optical forming device 100 is a flat plate made of resin or made of metal. The forming plate 20, as illustrated in FIG. 2, is placed on the +Z-side with respect to bottom portion 12 of the resin tank 10. Also, in the initial state of the forming device 100, the forming plate 20 is positioned within the resin tank 10 (initial position of the forming plate 20). The forming plate 20 is moved by the mover 30 in the +Z direction and the −Z direction. The forming plate 20 forms a three-dimensional object Ob on the surface 20a facing the bottom portion 12 of the resin tank 10.

The mover 30 of the optical forming device 100 causes the forming plate 20 to move in the +Z direction and the −Z direction. The mover 30 includes an arm 32 and a moving mechanism 34. The arm 32 of the mover 30 connects the forming plate 20 and the moving mechanism 34. The moving mechanism 34 of the mover 30 moves the forming plate 20 in the +Z-direction and the −Z direction via the arm 32. The moving mechanism 34 is equipped with a motor, a ball screw, a slider, and so on (non-illustrated).

Figure 3:
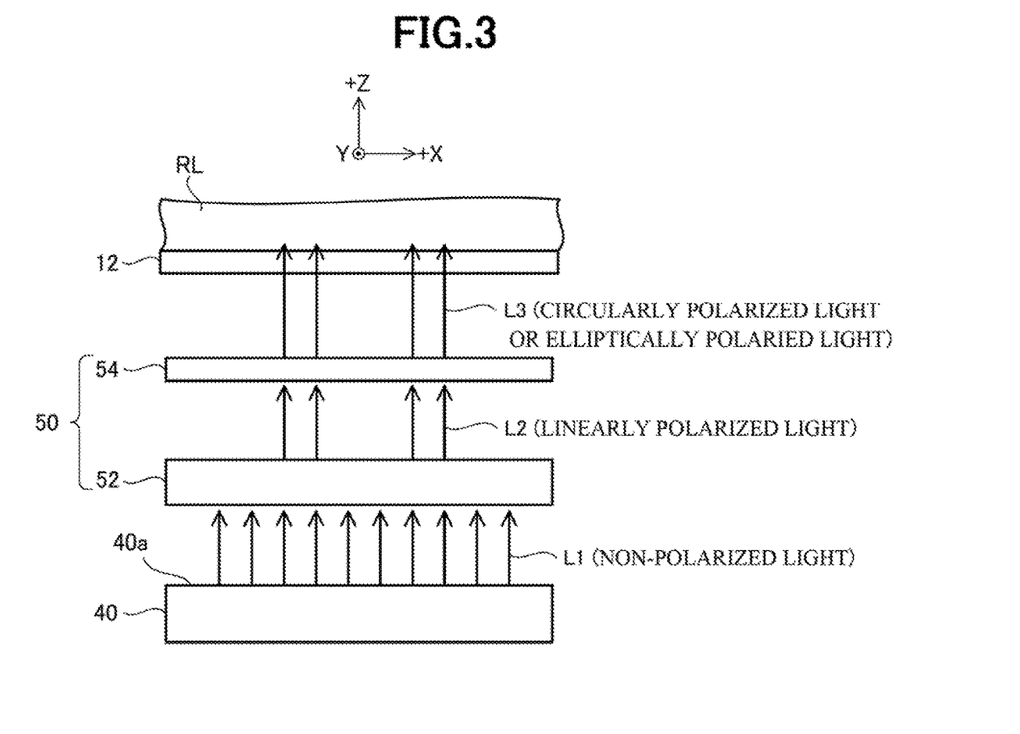
FIG. 3 is a schematic diagram illustrating states of light according to Embodiment 1.

The light source 40 of the optical forming device 100 emits, toward the liquid photocurable resin RL (+Z direction), light for causing the liquid photocurable resin RL (+Z direction) to undergo curing. In the present embodiment, the light source 40 is placed on the −Z-side with respect to the resin tank 10. The light source 40, as illustrated in FIG. 3, emits non-polarized UV light L1 in the +Z direction from an upper surface 40a located on the resin tank 10-side. The light source 40 is equipped with a reflection sheet, a light-emitting diode (LED) that emits UV light, a scattering sheet, and so on. The maximum intensity of a wavelength in the non-polarized UV light L1 emitted from the light source 40 is 405 nm, for example.

The optical modulator 50 of the optical forming device 100, as illustrated in FIG. 2, is placed between the resin tank 10 and the light source 40. The optical modulator 50 modulates light for curing the liquid photocurable resin RL emitted from the light source 40 in a pattern based on the shape of the three-dimensional object Ob, irradiating the liquid photocurable resin RL with the modulated light. In the present embodiment, the optical modulator 50, as illustrated in FIG. 3, irradiates the liquid photocurable resin RL, via the bottom portion 12 of the resin tank 10, with light, for causing the liquid photocurable resin RL to undergo curing, in a circularly polarized state or an elliptically polarized state. The optical modulator 50, as illustrated in FIG. 1 and FIG. 2, includes the liquid crystal device 52 and an optical retardation device 54.

The liquid crystal device 52 of the optical modulator 50 modulates, based on the shape of the three-dimensional object Ob, light, for causing the liquid photocurable resin RL to undergo curing, emitted from the light source 40. The liquid crystal device 52, as illustrated in FIG. 3, emits modulated light L2 as linearly polarized light. The liquid crystal device 52 is an active matrix-driven twisted nematic (TN)-type liquid crystal device and has multiple liquid crystal cells. The liquid crystal cells are arrayed into a matrix. The liquid crystal cells either block or enable passage therethrough of light that causes the liquid photocurable resin RL to undergo curing.

Specifically, the liquid crystal device 52 modulates, based on cross-sectional shape data indicating a shape of a cross-section perpendicular to the +Z direction of the three-dimensional object Ob, light for causing the liquid photocurable resin RL to undergo curing in a pattern corresponding to the cross-sectional shape of the three-dimensional object Ob. The liquid crystal device 52 emits light for causing the liquid photocurable resin RL to undergo curing in a pattern corresponding to the cross-sectional shape of the three-dimensional object Ob as linearly polarized light.

The optical retardation device 54 of the optical modulator 50 imparts phase difference to the linearly polarized light emitted from the liquid crystal device 52. The optical retardation device 54 also, as illustrated in FIG. 3, irradiates the liquid photocurable resin RL with phase-difference-imparted light L3. Since the optical retardation device 54 imparts phase difference to the linearly polarized light, the vibration direction of the light with which the liquid photocurable resin RL is to be irradiated rotates with respect to the direction of the flow of the liquid photocurable resin RL. Therefore, the optical forming device 100 can cause the liquid photocurable resin RL to undergo curing independent of the direction of the flow of the liquid photocurable resin RL, and thus can prevent or suppress unevenness in the density of the cured photocurable resin RS. The optical forming device 100 can also achieve high light utilization efficiency independent of the direction of the transition moment of the polymerization initiator. Furthermore, since interference of the light, for causing the liquid photocurable resin RL to undergo curing, can be prevented or suppressed at the bottom portion 12 formed of film, the optical forming device 100 can uniformly irradiate the liquid photocurable resin RL with the light for causing the liquid photocurable resin RL to undergo curing.

In the present embodiment, the optical retardation device 54 is a quarter waveplate that imparts a phase difference of one-fourth a wavelength, and thus the liquid photocurable resin RL is irradiated with circularly polarized light or elliptically polarized light. For example, at the wavelength (405 nm) having the maximum intensity of the light emitted by the light source 40, the optical retardation device 54 imparts the light with a phase difference that is one-fourth of the wavelength having the maximum intensity..

The controller 60 of the optical forming device 100 controls the mover 30, the light source 40, and the optical modulator 50. The controller 60 also generates cross-sectional shape data indicating a shape of a cross-section perpendicular to the +Z direction of the three-dimensional object Ob based on three-dimensional shape data indicating the three-dimensional shape of the three-dimensional object Ob. The cross-sectional shape data indicating the shape of the cross-section perpendicular to the +Z direction is generated at a predetermined interval in the +Z direction.

The controller 60, as illustrated in FIG. 1, includes a central processing unit (CPU) 62 for executing each of the types of processing, a read-only memory (ROM) 64 for preliminarily storing programs and data, a random access memory (RAM) 66 for storing data, and an input-output interface 68 for inputting and outputting signals between the components. The functions of the controller 60 are achieved by execution of the programs stored in the ROM 64 by the CPU 62. The input-output interface 68 inputs and outputs signals between the CPU 62, the mover 30, the light source 40, the optical modulator 50, and a non-illustrated external device.

Next the forming method of the three-dimensional object Ob is described with reference to FIG. 4. In the present embodiment, the three-dimensional object Ob is formed by stacking layers of cured photocurable resin RS at a predetermined interval by the optical forming device 100.

Figure 4:
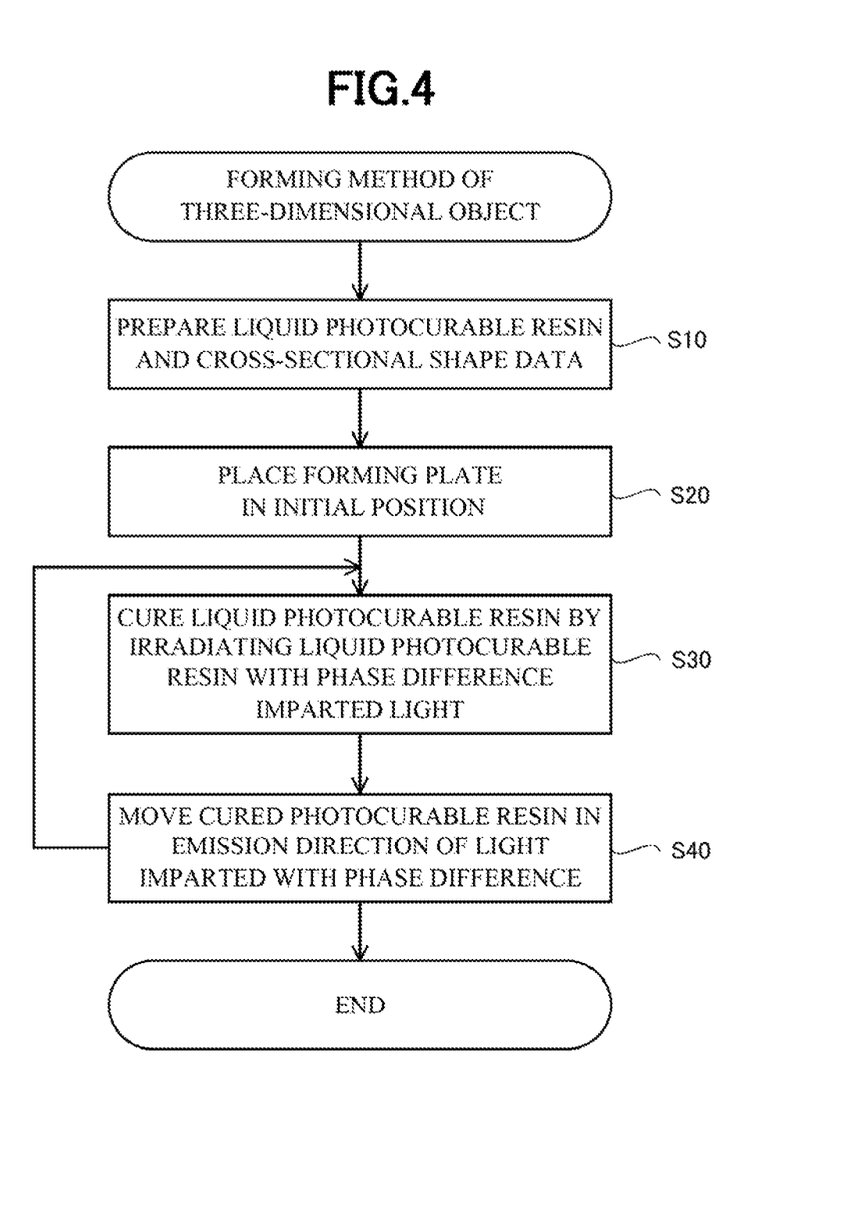
FIG. 4 is a flowchart illustrating a forming method of a three-dimensional object according to Embodiment 1.

FIG. 4 is a flowchart of the forming method of the three-dimensional object Ob. The forming method of three-dimensional object Ob includes a step of preparing a liquid photocurable resin RL and cross-sectional shape data (step S10), a step of placing the forming plate 20 at an initial position (step S20), a step of causing the liquid photocurable resin RL to undergo curing by (i) imparting a phase difference to linearly polarized light emitted from the liquid crystal device 52 that modulates light from the light source 40 and then (ii) irradiating the liquid photocurable resin RL with the phase-difference-imparted light L3 (step S30), and a step of moving the cured photocurable resin RS in an emission direction of the phase-difference-imparted light L3 (step S40). In the present embodiment, step S30 and step S40 are repeated equal to the layer count of the cured photocurable resin RS.

In step S10, the liquid photocurable resin RL for forming the three-dimensional object Ob and the cross-sectional shape data indicating the shape of the cross-section perpendicular to the +Z direction of the three-dimensional object Ob are prepared. In the present embodiment, the liquid photocurable resin RL is a liquid UV curable resin. The liquid photocurable resin RL is retained in the resin tank 10 of the optical forming device 100. The cross-sectional shape data is generated by the controller 60 of the optical forming device 100 at a predetermined interval in the +Z direction based on the three-dimensional shape data indicating the three-dimensional shape of a three-dimensional object Ob inputted from an external device. The three-dimensional data is, for example, a three-dimensional computer-aided design (CAD) of the three-dimensional object Ob.

In step S20, the forming plate 20 is moved by the mover 30. By doing so, the forming plate 20 is placed in the initial position. Specifically, the forming plate 20 is placed, within the liquid photocurable resin RL, in a position where the interval between (i) the surface 20a on which the three-dimensional object Ob is to be formed and (ii) the bottom portion 12 of the resin tank 10 is a thickness of a single layer worth (predetermined interval) of the cured photocurable resin RS.

In step S30, UV light is emitted from the light source 40. The emitted UV light is modulated by the liquid crystal device 52 based on the first layer of the cross-sectional shape data, thereby causing the modulated UV light to be emitted as linearly polarized light from the liquid crystal device 52. Then, the optical retardation device 54 imparts a phase difference to the linearly polarized light emitted from the liquid crystal device 52. The optical retardation device 54 irradiates the liquid photocurable resin RL with the phase-difference-imparted light L3 via the bottom portion 12 of the resin tank 10. By doing so, the liquid photocurable resin RL cures, thereby forming the first layer of the cured photocurable resin RS.

In the present embodiment, since the optical retardation device 54 imparts a phase difference to the linearly polarized light, the vibration direction of the light to be emitted onto the liquid photocurable resin RL rotates with respect to the direction of the flow of the liquid photocurable resin RL. Therefore, the forming method of the present embodiment can prevent or suppress unevenness in the density of the cured photocurable resin RS by causing the liquid photocurable resin RL to undergo curing independent of the flow of the liquid photocurable resin RL brought on by movement to the initial position of the forming plate 20. The forming method of the present embodiment can also achieve high light utilization efficiency independent of the direction of the transition moment of the polymerization initiator.

Furthermore, since the bottom portion 12 of the resin tank 10 in the present embodiment is formed of porous film that enables oxygen to permeate therethrough, a liquid photocurable resin RL layer (a liquid photocurable resin RL layer that inhibits polymerization) is formed between the cured photocurable resin RS and the bottom portion 12. Therefore, the cured photocurable resin RS can be prevented from coming in close contact to the bottom portion 12.

In step S40, the cured photocurable resin RS (forming plate 20) is moved by the mover 30 a distance equal to the thickness of the cured photocurable resin RS in an emission direction (+Z direction) of the phase-difference-imparted light L3. By doing so, the liquid photocurable resin RL flows in between the cured photocurable resin RS and the bottom portion 12 of the resin tank 10.

Next, referring back to step S30, the UV light emitted from the light source 40 is modulated by the liquid crystal device 52 based on the second layer of cross-sectional shape data, thereby causing the modulated UV light to be emitted as linearly polarized light from the liquid crystal device 52. Then, the optical retardation device 54 imparts a phase difference to the linearly polarized light emitted from the liquid crystal device 52. The optical retardation device 54 irradiates the liquid photocurable resin RL with the phase-difference-imparted light L3. By doing so, the second layer of the cured photocurable resin RS is formed. In a manner similar to that in the previous iteration of step S30, the vibration direction of the light with which the liquid photocurable resin RL is to be irradiated rotates with respect to the direction of the flow of the liquid photocurable resin RL. Therefore, the method of the present embodiment can prevent or suppress unevenness in the density of the cured photocurable resin RS by causing the liquid photocurable resin RL to undergo curing independent of the flow of the liquid photocurable resin RL brought on by movement of the forming plate 20 in step S40. The forming method of the present embodiment can also achieve high light utilization efficiency.

In the present embodiment, step S30 and step S40 are carried out alternatingly. The formation of the three-dimensional object Ob is completed once both step S30 and step S40 have been repeated equal to the layer count of the cured photocurable resin RS of the three-dimensional object Ob. With this process, the optical forming device 100 can form the three-dimensional object Ob.

As described above, since the optical forming device 100 irradiates the liquid photocurable resin RL with light whose vibration direction is rotated with respect to the direction of the flow of the liquid photocurable resin RL, the liquid photocurable resin RL can be cured independent of the direction of the flow of the liquid photocurable resin RL, and thus unevenness in the density of the cured photocurable resin RS can be prevented or suppressed. The optical forming device 100 can also achieve high light utilization efficiency independent of the direction of the transition moment of the polymerization initiator.

Furthermore, the forming method of the three-dimensional object Ob of the present embodiment enables manufacturing of a three-dimensional object Ob in which unevenness in the density of the cured photocurable resin RS is prevented or suppressed.

Embodiment 2

The optical forming device 100 of Embodiment 1 irradiates the liquid photocurable resin RL, via the bottom portion 12 of the resin tank 10, with light for causing the liquid photocurable resin to undergo curing. The liquid photocurable resin RL may be irradiated, from the opening 16 of the resin tank 10, with light for causing the liquid photocurable resin RL to undergo curing.

Figure 5:
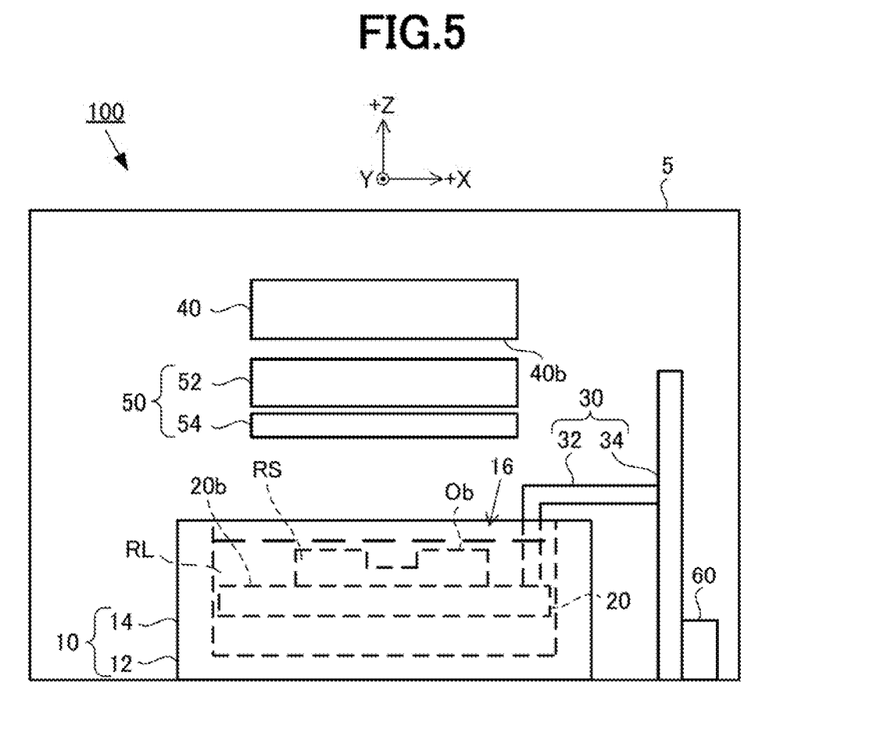
FIG. 5 is a schematic diagram illustrating an optical forming device according to Embodiment 2.

The optical forming device 100 of the present disclosure is described with reference to FIG. 5. The optical forming device 100 of the present disclosure, similar to the optical forming device 100 of Embodiment 1, includes the resin tank 10, the forming plate 20, the mover 30, the light source 40, the optical modulator 50, and the controller 60.

The resin tank 10 of the present embodiment, similar to the resin tank 10 of Embodiment 1, retains liquid photocurable resin RL. The resin tank 10 of the present embodiment is a box-shaped container having the opening 16 at the +Z side surface of the resin tank 10. In the present embodiment, the liquid photocurable resin RL is irradiated, from the opening 16, with light for causing the liquid photocurable resin RL to undergo curing. The bottom portion 12 and the wall portion 14 of the resin tank 10 of the present embodiment are integrally formed of resin, metal, and the like that block light from curing the liquid photocurable resin RL. The liquid photocurable resin RL of the present embodiment, similar to that in Embodiment 1, is a liquid UV curable resin.

The forming plate 20 of the present embodiment, similar to the forming plate 20 of Embodiment 1, is a flat plate made of resin or made of metal. The forming plate 20 of the present embodiment is positioned within the resin tank 10. The forming plate 20 of the present embodiment is moved by the mover 30 in the +Z direction and the −Z direction. The forming plate 20 of the present disclosure, as illustrated in FIG. 5, forms a three-dimensional object Ob on a surface 20b opposite to the bottom portion 12 of the resin tank 10.

The mover 30 of the present embodiment, similar to the mover 30 of Embodiment 1, moves the forming plate 20 in the +Z direction and the −Z direction. The configuration of the mover 30 of the present embodiment is similar to the mover 30 of Embodiment 1.

The light source 40 of the present embodiment emits, toward the liquid photocurable resin RL (−Z direction) light for causing the liquid photocurable resin RL to undergo curing. In the present embodiment, the light source 40 is placed on the +Z side with respect to the resin tank 10. The light source 40 emits the non-polarized UV light L1 from a bottom surface 40b located on the resin tank 10-side in the −Z direction. The other features of the light source 40 of the present embodiment are similar to those of the light source 40 of Embodiment 1.

The optical modulator 50 of the present embodiment, similar to the optical modulator 50 of Embodiment 1, is placed between the resin tank 10 and the light source 40. Except for the feature of irradiating the liquid photocurable resin RL with the phase-difference-imparted light L3 from the opening 16 of the resin tank 10, the features of the optical modulator 50 of the present embodiment are the same as those of the optical modulator 50 of Embodiment 1. In the present embodiment as well, the vibration direction of the light with which the liquid photocurable resin RL is to be irradiated rotates with respect to the direction in which the liquid photocurable resin RL flows. Therefore, the optical forming device 100 can cause the liquid photocurable resin RL to undergo curing independent of the direction of the flow of the liquid photocurable resin RL, and thus can prevent or suppress unevenness in the density of the cured photocurable resin RS. The optical forming device 100 of the present embodiment 1 can also achieve high light utilization efficiency independent of the direction of the transition moment of the polymerization initiator.

The controller 60 of the present embodiment, similar to the controller 60 of Embodiment 1, controls the mover 30, the light source 40, and the optical modulator 50. The controller 60 of the present embodiment generates cross-sectional shape data indicating a shape of a cross-section perpendicular to the +Z direction of the three-dimensional object Ob based on three-dimensional shape data indicating the three-dimensional shape of the three-dimensional object Ob. Except for the feature of generating the cross-sectional data at a predetermined interval in the −Z direction, the features of the controller 60 of the present embodiment are the same as those of the controller 60 of Embodiment 1.

The forming method of the three-dimensional object Ob of the present embodiment is described with reference to FIG. 4. The forming method of the three-dimensional object Ob, similar to the forming method of Embodiment 1, includes a step of preparing a liquid photocurable resin RL and cross-sectional shape data (step S10), a step of placing the forming plate 20 at an initial position (step S20), a step of causing the liquid photocurable resin RL to undergo curing by (i) imparting a phase difference to linearly polarized light emitted from the liquid crystal device 52 that modulates light from the light source 40 and then (ii) irradiating the liquid photocurable resin RL with the phase-difference-imparted light L3 (step S30), and a step of moving the cured photocurable resin RS in an emission direction of the phase-difference-imparted light L3 (step S40). Step S30 and step S40 are repeated equal to the layer count of the cured photocurable resin RS.

In step S10, similar to step S10 of Embodiment 1, the liquid photocurable resin RL for forming the three-dimensional object Ob and the cross-sectional shape data indicating the shape of the cross-section perpendicular to the +Z direction of the three-dimensional object Ob are prepared. In the present embodiment, the cross-sectional shape data is generated by the controller 60 of the optical forming device 100 at a predetermined interval in the −Z direction based on the three-dimensional shape data indicating the three-dimensional shape of a three-dimensional object Ob inputted from an external device. Except for this, this step is the same as step S10 of Embodiment 1.

In step S20, similar to step S20 in Embodiment 1, the forming plate 20 is placed in the initial position by the mover 30. Specifically, the forming plate 20 is placed, within the liquid photocurable resin RL, in a position where the interval between (i) the surface 20b on which the three-dimensional object Ob is to be formed and (ii) the liquid surface of the liquid photocurable resin RL is a thickness of a single layer worth of the cured photocurable resin RS.

In step S30, UV light is emitted from the light source 40. The emitted UV light is modulated by the liquid crystal device 52 based on the first layer of cross-sectional shape data, thereby causing the modulated UV light to be emitted as linearly polarized light from the liquid crystal device 52. Then, the optical retardation device 54 imparts a phase difference to the linearly polarized light emitted from the liquid crystal device 52. The optical retardation device 54 irradiates the liquid photocurable resin RL from the opening 16 of the resin tank 10 with phase-difference-imparted light L3. By doing so, the first layer of the cured photocurable resin RS is formed. Similar to that in step S30 of Embodiment 1, the vibration direction of the light with which the liquid photocurable resin RL is to be irradiated rotates with respect to the direction of the flow of the liquid photocurable resin RL. Therefore, the forming method of the present embodiment can cause the liquid photocurable resin RL to undergo curing independent of the direction of the flow of the liquid photocurable resin RL brought on by the moving of the forming plate 20 to the initial position, and thus can prevent or suppress unevenness in the density of the cured photocurable resin RS. The forming method of the present embodiment can also achieve high light utilization efficiency.

In step S40, the cured photocurable resin RS (forming plate 20) is moved by the mover 30 a distance equal to the thickness of the cured photocurable resin RS in a emission direction (−Z direction) of the phase-difference imparted light L3. By doing so, the liquid photocurable resin RL flows onto the cured photocurable resin RS.

Referring back to step S30, the second layer of cured photocurable resin RS is formed based on the second layer of cross-sectional shape data, similar to that in Embodiment 1. In the present step as well, the vibration direction of the light with which the liquid photocurable resin RL is to be irradiated rotates with respect to the direction of the flow of the liquid photocurable resin RL. Therefore, the forming method of the present embodiment can cause the liquid photocurable resin RL to undergo curing independent of the direction of the flow of the liquid photocurable resin RL brought on by movement of the forming plate 20 in step S40, and thus can prevent or suppress unevenness in the density of the cured photocurable resin RS. The forming method of the present embodiment can also achieve high light utilization efficiency.

In the present embodiment as well, step S30 and step S40 are carried out alternatingly. The formation of the three-dimensional object Ob is completed once both step S30 and step S40 have been repeated equal to the layer count of the cured photocurable resin RS of the three-dimensional object Ob. With this process, the optical forming device 100 can form the three-dimensional object Ob.

As described above, the optical forming device 100 of the present embodiment can cause the liquid photocurable resin RL to undergo curing independent of the direction of the flow of the liquid photocurable resin RL, and thus can prevent or suppress unevenness in the density of the cured photocurable resin RS. The optical forming device 100 of the present embodiment can also achieve high light utilization efficiency independent of the direction of the transition moment of the polymerization initiator. Furthermore, the forming method of the three-dimensional object Ob of the present embodiment enables manufacturing of a three-dimensional object Ob in which unevenness in the density of the cured photocurable resin RS is prevented or suppressed.

Modified Examples

The above-described embodiments can be modified in various manners without departing from the gist of the present disclosure.

For example, the bottom portion 12 of the resin tank 10 of Embodiment 1 is formed of porous film. The bottom portion 12 of the resin tank 10 of Embodiment 1 may be formed of glass, resin, and the like that enable light, for causing the liquid photocurable resin RL to undergo curing, to pass therethrough. The bottom portion 12 formed of glass, resin, and the like may be subjected to peeling treatment (for example, silicone coating treatment). By doing so, the bottom portion 12 and the cured photocurable resin RS can be prevented from coming in close contact with each other.

Figure 6:
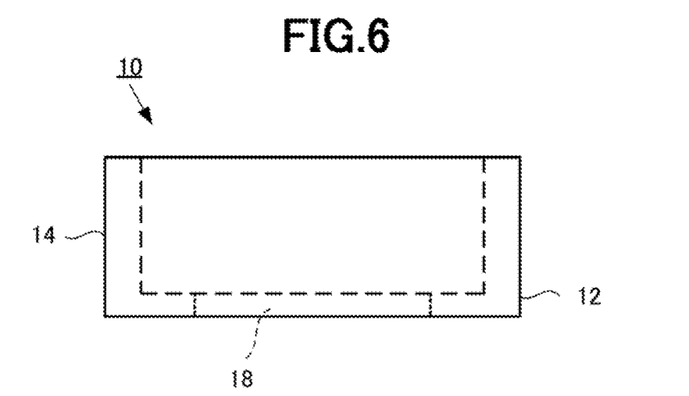
FIG. 6 is a schematic diagram illustrating a resin tank according to a modified example.

Furthermore, the bottom portion 12 of the resin tank 10 of Embodiment 1, as illustrated in FIG. 6, may include a transmissive portion 18. In such a case, the bottom portion 12 and the wall portion 14 are integrally formed of metal, resin, and the like that block light from curing the liquid photocurable resin RL. The transmissive portion 18 is formed of a member that enables light, for causing the liquid photocurable resin RL to undergo curing, to pass therethrough. The liquid photocurable resin RL is irradiated with the phase-difference-imparted light L3 via the transmissive portion 18.

The liquid photocurable resin RL is not limited to a liquid UV curable resin. The liquid photocurable resin RL may be, for example, a liquid resin that is cured by being irradiated with visible light. Furthermore, the liquid photocurable resin RL may include a polymerization inhibitor, metal nanoparticles, a pigment, and the like.

The light emitted from the light source 40 is not limited to UV light. The light source 40 emits light for causing the liquid photocurable resin RL to undergo curing. The light source 40 may emit visible light in accordance with the wavelength at which the polymerization initiator included in the liquid photocurable resin RL generates active species.

Alternatively, the light source 40 may be equipped with a lamp instead of the LED. Moreover, from the perspective of improving formation accuracy, the light source 40 preferably is equipped with a collimator that collimates light emitted for causing the liquid photocurable resin RL to undergo curing, resulting in collimated light.

The liquid crystal device 52 is not limited to the TN-type liquid crystal device. The liquid crystal device 52 may be a vertical alignment (VA)-type liquid crystal device, a fringe-field switching (FFS)-type liquid crystal device, and the like.

In addition to allowing light for causing the liquid photocurable resin RL to undergo curing, to pass therethrough or shielding such light from passing therethrough, the liquid crystal device 52 may modulate the amount of light, for causing the liquid photocurable resin RL to undergo curing, to be passed therethrough.

Preferably, the optical retardation device 54 is in close contact with the liquid crystal device 52. For example, it is sufficient if (i) the optical retardation device 54 is stacked on a light polarizing layer of the liquid crystal device 52 on the emission side and (ii) the optical retardation device 54 and the liquid crystal device 52 are integrally formed. By doing so, the light utilization efficiency can be improved. Moreover, the light emitted from the liquid crystal device 52 can be suppressed or prevented from spreading. From the perspective of making the intensity at which the liquid photocurable resin RL is irradiated with light more uniform, at the wavelength having the maximum intensity of the light emitted by the light source 45, the variation range of the phase difference that the optical retardation device 54 imparts is preferably within plus 10% or minus 10% of one-fourth the wavelength having the maximum intensity.

Furthermore, preferably, the optical retardation device 54 of the optical forming device 100 of Embodiment 1 is in close contact with the bottom portion 12 of the resin tank 10.

In Embodiments 1 and 2, the optical forming device 100 forms the three-dimensional object Ob by successively stacking the layers of the cured photocurable resin RS. The optical forming device 100 may continuously form the three-dimensional object Ob by continuously irradiating the liquid photocurable resin RL with light for causing the liquid photocurable resin RL to undergo curing by the optical modulator 50 while continuously moving the forming plate 20.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

This application claims the benefit of Japanese Patent Application No. 2019-201028 filed on Nov. 5, 2019, the entire disclosure of which is incorporated by reference herein.

The invention claimed is:

1. An optical forming device comprising:
   a light source to emit light for causing a liquid photocurable resin to undergo curing; and
   an optical modulator to modulate the light for causing the liquid photocurable resin to undergo curing in a pattern based on a shape of a three-dimensional object, and irradiate the liquid photocurable resin with the modulated light,
   wherein the optical modulator includes
      a liquid crystal device to modulate the light for causing the liquid photocurable resin to undergo curing in the pattern, and emit the modulated light as linearly polarized light, and
      an optical retardation device to impart a phase difference to the linearly polarized light emitted from the liquid crystal device, and emit the light imparted with the phase difference.

2. The optical forming device according to claim 1, wherein the optical modulator irradiates the liquid photocurable resin with circularly polarized light or elliptically polarized light.

3. The optical forming device according to claim 1, wherein at a wavelength having the maximum intensity of the light emitted by the light source, the optical retardation device imparts the light with a phase difference of one-fourth the wavelength having the maximum intensity.

4. The optical forming device according to claim 1, further comprising:
   a resin tank having a bottom portion that enables light for causing the liquid photocurable resin to undergo curing to pass therethrough, the resin tank holding the liquid photocurable resin,
   wherein the optical modulator irradiates the liquid photocurable resin with the modulated light via the bottom portion of the resin tank.

\* \* \* \* \*